(12) United States Patent
Yasuhara

(10) Patent No.: US 6,463,482 B1
(45) Date of Patent: Oct. 8, 2002

(54) CONTROL, OF CONFLICT BETWEEN MPC TRANSFER AND DMC TRANSFER WITH MEASUREMENT OF INSTRUCTION EXECUTION TIME

(75) Inventor: Masaki Yasuhara, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/337,248

(22) Filed: Jun. 22, 1999

(30) Foreign Application Priority Data

Jun. 22, 1998 (JP) .......................................... 10-174870

(51) Int. Cl.⁷ .............................................. G06F 13/28
(52) U.S. Cl. ........................ 710/25; 710/22; 710/116; 710/308; 710/309
(58) Field of Search ................................ 710/22–28, 40, 710/45, 107, 113, 123, 124, 240–244, 306, 308, 309, 116

(56) References Cited

U.S. PATENT DOCUMENTS

| | | | | |
|---|---|---|---|---|
| 4,583,160 A | * | 4/1986 | Iguma ........................ | 710/107 |
| 4,959,782 A | * | 9/1990 | Tulpule et al. .............. | 710/240 |
| 5,179,663 A | * | 1/1993 | Iimura ......................... | 710/35 |
| 5,392,404 A | * | 2/1995 | Thompson ................... | 710/40 |
| 5,499,345 A | * | 3/1996 | Watanabe ................... | 710/117 |
| 5,544,346 A | * | 8/1996 | Amini et al. ................ | 711/154 |
| 5,974,479 A | * | 10/1999 | Satoh .......................... | 710/22 |
| 5,996,037 A | * | 11/1999 | Emnett ....................... | 710/117 |
| 6,105,082 A | * | 8/2000 | Hirai et al. .................. | 710/18 |
| 6,115,767 A | * | 9/2000 | Hashimoto et al. ......... | 710/107 |

FOREIGN PATENT DOCUMENTS

| | | | | |
|---|---|---|---|---|
| JP | 58-109916 | 6/1983 | ............. | G06F/3/00 |
| JP | 5-151143 | 6/1993 | ........... | G06F/13/24 |
| JP | 644179 | 2/1994 | ........... | G06F/13/28 |
| JP | 6-266652 | 9/1994 | ........... | G06F/13/34 |
| JP | 2505115 | 4/1996 | ........... | G06F/13/36 |
| JP | 2533152 | 6/1996 | ........... | G06F/13/28 |
| JP | 10-63610 | 3/1998 | ........... | G06F/13/34 |
| JP | 1063615 | 3/1998 | ......... | G06F/13/362 |

* cited by examiner

*Primary Examiner*—Jeffrey Gaffin
*Assistant Examiner*—Ilwoo Park
(74) *Attorney, Agent, or Firm*—Hayes Soloway, P.C.

(57) ABSTRACT

A data transfer control apparatus is disclosed for controlling conflict of data transfer on a data bus connected to a microprocessor through a bridge circuit. The bridge circuit includes a monitoring unit. When an execution instruction for MPC transfer is issued during DMA transfer, the monitoring unit measures a time period over which the data bus is to be occupied with the MPC transfer. When the PCI bus is to be occupied with the MPC transfer for a predetermined time period, the monitoring unit does not suspend the DMA transfer but performs the MPC transfer after the completion of the DMA transfer.

4 Claims, 5 Drawing Sheets

CONTROL, OF CONFLICT BETWEEN MPC TRANSFER AND DMC TRANSFER WITH MEASUREMENT OF INSTRUCTION EXECUTION TIME

BACKGROUND OF THE INVENTION

1. Field of the Invention

The present invention relates to a data transfer control apparatus for controlling data transfer on a data bus such as a PCI (Peripheral Component Interconnect) bus connected to a microprocessor through a bridge circuit.

2. Description of the Related Art

As a general-purpose bus for connecting external devices to a personal computer or the like, a PCI bus has been increasingly employed. The PCI bus is connected to a microprocessor through a bridge circuit. The PCI bus is designed to enable connection of external peripheral devices such as a memory module conforming to the PCI bus standard.

Such data transfer through a PCI bus includes DMA (Direct Memory Access) transfer and MPC (Microprocessor Controller) transfer.

DMA transfer refers to direct data transfer between peripheral devices connected to a PCI bus not through a microprocessor. MPC transfer refers to data transfer through a PCI bus performed by an MPC which controls data, processing or the like in accordance with directions from a microprocessor (not shown).

The DMA transfer is controlled by a SCSI (Small Computer System Interface) protocol controller for controlling a SCSI which is an interface between peripheral devices not through a microprocessor. A configuration of such a data transfer control apparatus in the prior art is shown in FIG. 1.

The data transfer control apparatus in the prior art comprises a MPC 2, a bridge circuit 17, a PCI bus 6, a SPC (SCSI protocol controller) 4, a memory module 5, and a local memory 3.

Local memory 3 is a memory connected to a microprocessor (not shown) not through PCI bus 6. MPC 2 effects data control, data processing or the like in accordance with directions from the microprocessor. SPC 4 controls a SCSI. Memory module 5 is connected to PCI bus 6 as an external memory. Bridge circuit 17 performs connection between MPC 2 and local memory 3 as well as MPC 2 and PCI bus 6.

When DMA transfer is performed in the prior art data transfer control apparatus, as shown in FIG. 2, SPC 4 transfers data directly to and from memory module 5 through PCI bus 6. When MPC transfer is performed in the prior art data transfer control apparatus, as shown in FIG. 3, MPC 2 transfers data to and from memory module 5 through bridge circuit 17 and PCI bus 6.

The DMA transfer and MPC transfer, both through PCI bus 6, are unable to be performed simultaneously. For this reason, if a transfer request for one of data transfer is made while the other data transfer is being performed, the one data transfer is controlled to be performed after the completion of the other data transfer.

However, since a microprocessor executes not only control for data transfer but also other various control, a long time required only for data transfer control exerts an influence upon other control, leading to an influence upon the entire device such as a personal computer. Therefore, control is generally made to perform MPC transfer with a higher priority than DMA transfer.

Next, operation will be described with reference to a flow chart in FIG. 4 in a case where a request for MPC transfer is made from MPC 2 while DMA transfer is being performed in the prior art data transfer control apparatus.

First, DMA transfer is performed at step 101. Bridge circuit 17 receives an MPC transfer instruction from MPC 2 before the DMA transfer is completed at step 102, and the preceding DMA transfer is suspended at step 103. MPC transfer is performed at step 104 and the DMA transfer is resumed after the completion of the MPC transfer at step 105.

In this manner, in the prior art data transfer control apparatus, if an instruction for MPC transfer is received during execution of DMA transfer on the PCI bus, the preceding DMA transfer is suspended to perform MPC transfer regardless of an influence of the MPC transfer upon the PCI bus, and the DMA transfer is resumed after the completion of the MPC transfer. As a result, when the PCI bus is occupied with MPC transfer for a long time because an MPC transfer instruction is frequently generated or the amount of data transfer for MPC transfer is large, DMA transfer is unable to proceed, causing a data transfer rate to be lowered.

SUMMARY OF THE INVENTION

It is an object of the present invention to provide a data transfer control apparatus capable of preventing a data transfer rate from being lowered due to DMA transfer not proceeding even when a PCI bus is occupied with MPC transfer for a long time because of a frequently generated MPC transfer instruction or a large amount of data transfer for MPC transfer.

To achieve the aforementioned object, a data transfer control apparatus according to the present invention has a bridge circuit that includes a monitoring means. When an MPC transfer instruction is issued during DMA transfer, the monitoring means measures a time period over which a data bus is to be occupied with MPC transfer. When the data bus is to be occupied with the MPC transfer for a predetermined time period, the monitoring means does not suspend the DMA transfer but performs MPC transfer after the completion of the DMA transfer. Therefore, DMA transfer is not suspended by MPC transfer for a long time to prevent a data transfer rate from being lowered, thereby improving throughput of data transfer.

The above and other objects, features and advantages of the present invention will be apparent from the following description with reference to the accompanying drawings which illustrate examples of the present invention.

DETAILED DESCRIPTION OF THE PREFERRED EMBODIMENT

Figure 1:
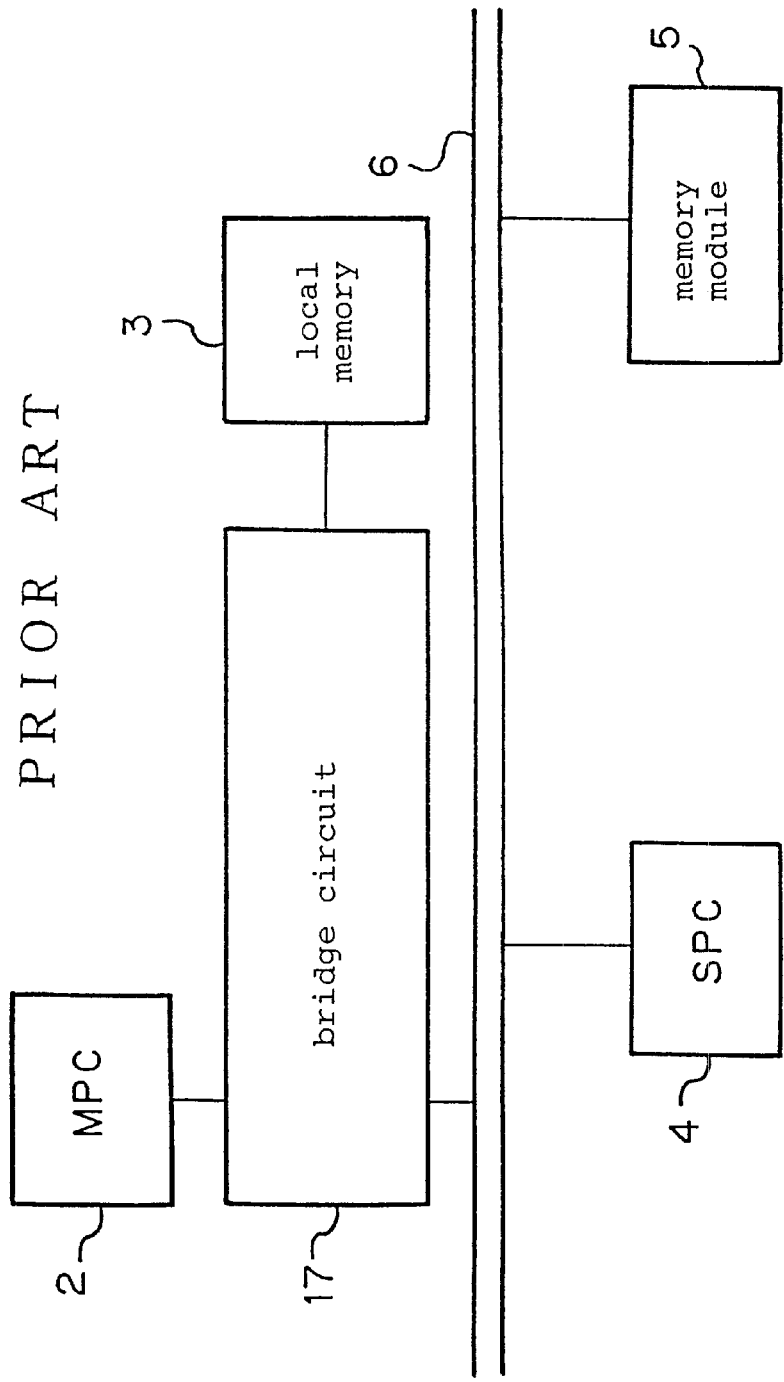
FIG. 1 is a block diagram showing a configuration of a prior art data transfer control apparatus.
Figure 2:
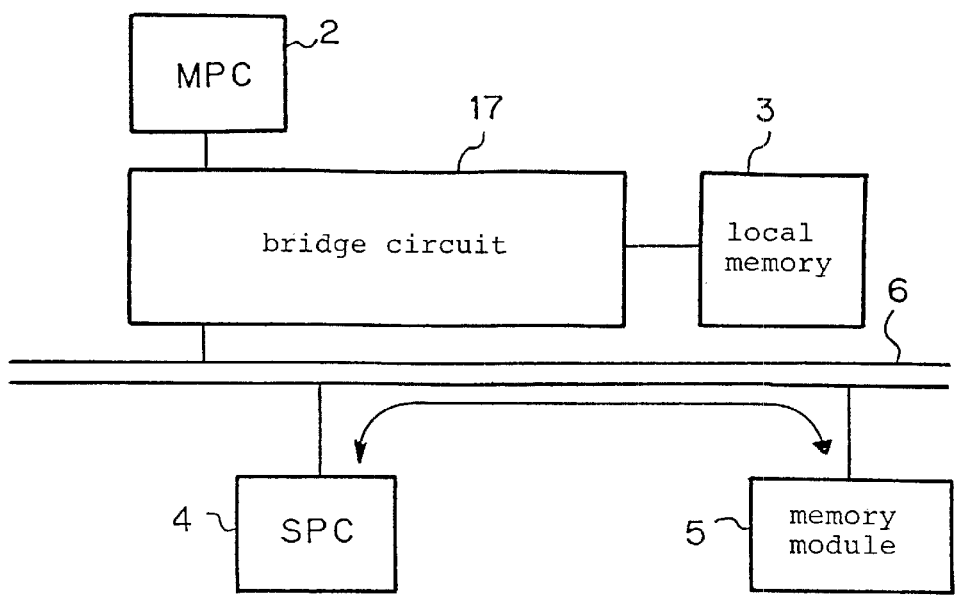
FIG. 2 is a diagram for illustrating DMA transfer in the data transfer control apparatus in FIG. 1.
Figure 3:
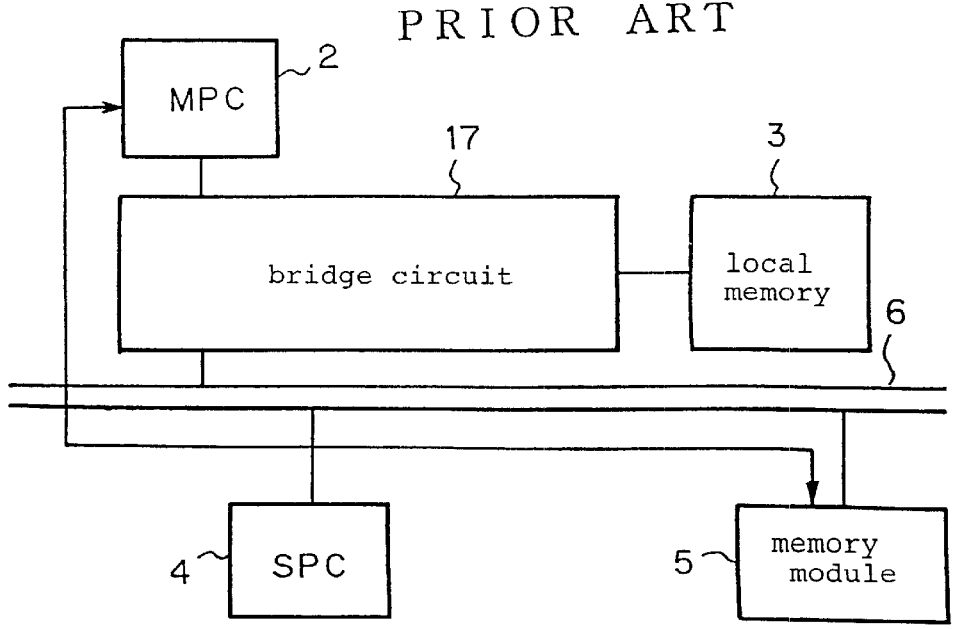
FIG. 3 is a diagram for illustrating MPC transfer in the data transfer control apparatus in FIG. 1.
Figure 4:
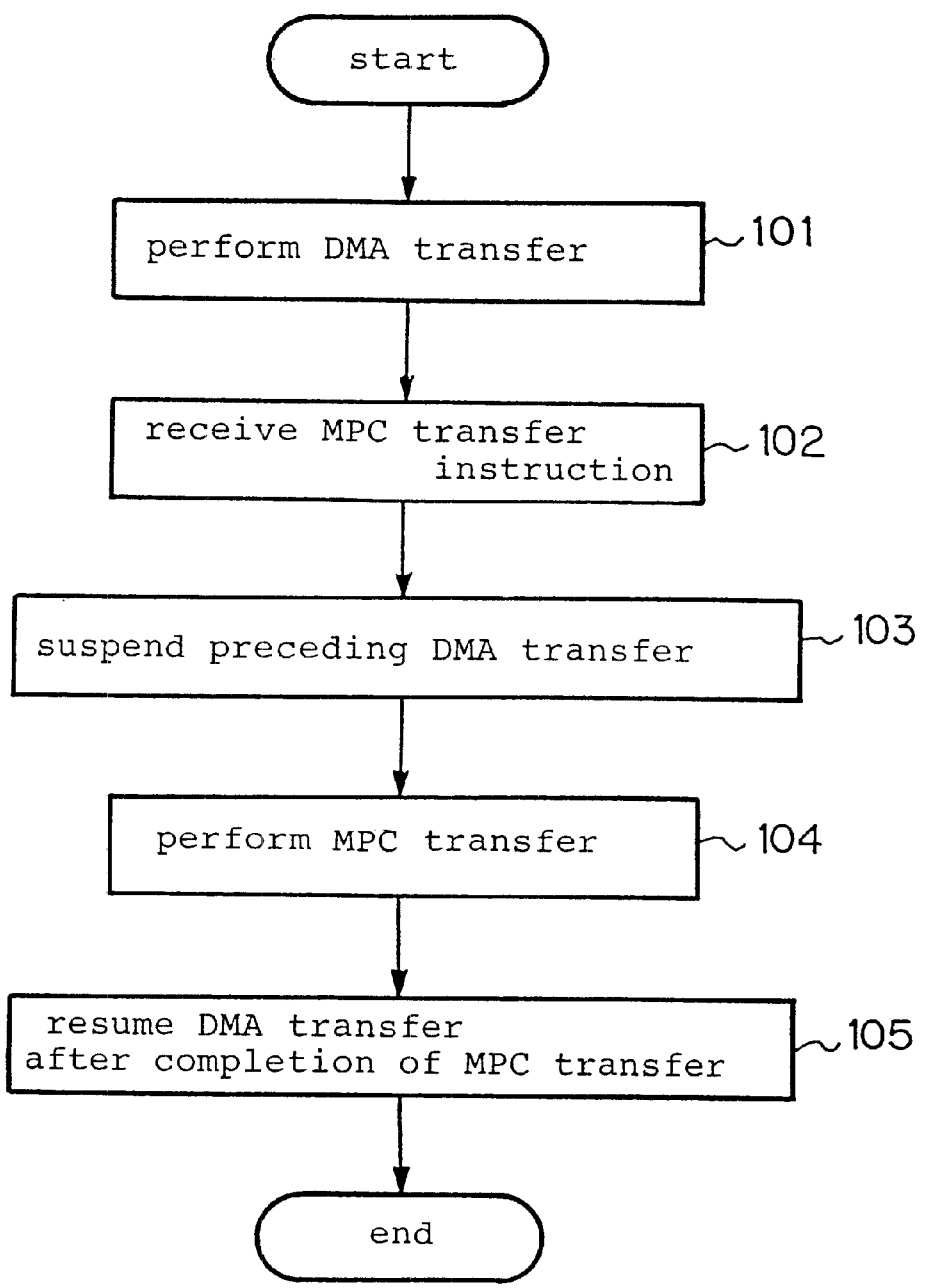
FIG. 4 is a flow chart illustrating operation of the data transfer control apparatus in FIG. 1.
Figure 5:
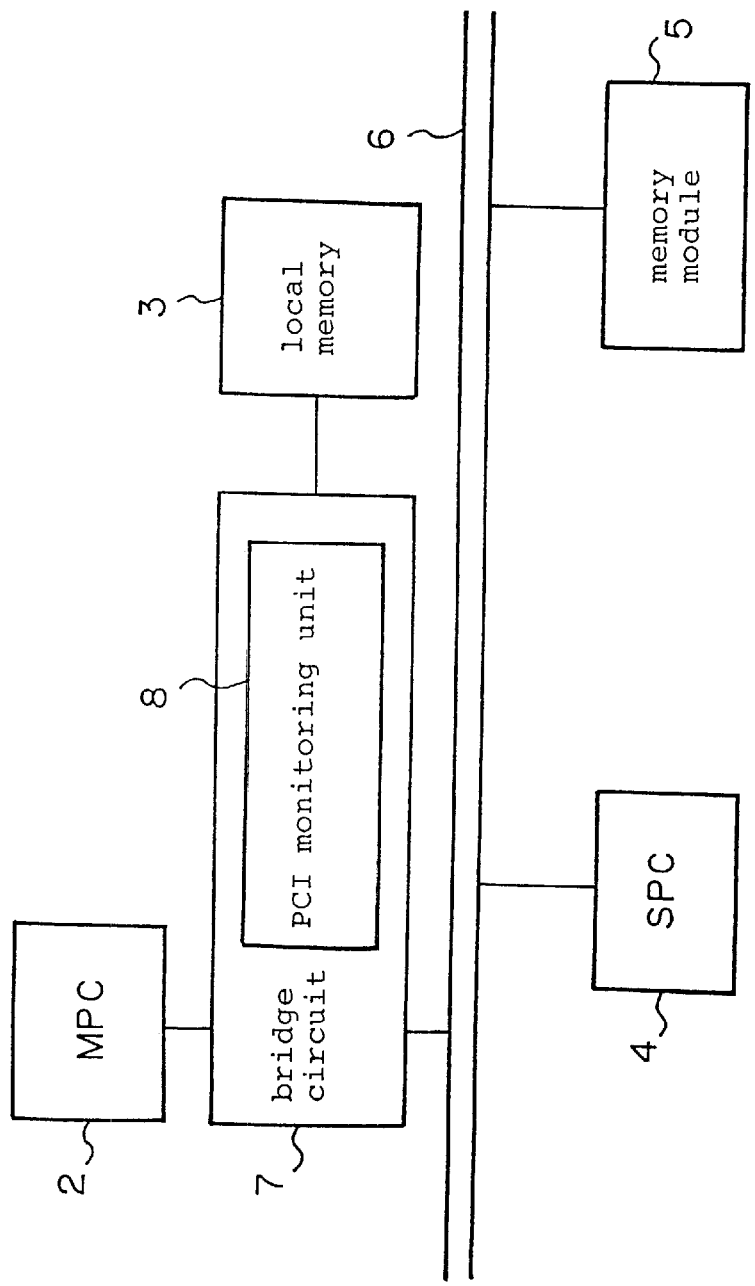
FIG. 5 is a block diagram showing a configuration of a data transfer control apparatus of an embodiment according to the present invention.

Referring now to FIG. 5, there is shown a data transfer control apparatus according to an embodiment of the present invention which includes a bridge circuit 7 instead of bridge circuit 17 in the prior art data transfer control apparatus shown in FIG. 1.

Bridge circuit 7 has a PCI monitoring unit 8 in addition to functions of bridge circuit 17 in FIG. 1. PCI monitoring unit 8 monitors data transfer instructions on PCI bus 6 and performs such a control that when PCI bus 6 is to be occupied with MPC transfer for a predetermined time period or longer, the preceding DMA transfer may not be suspended.

Figure 6:
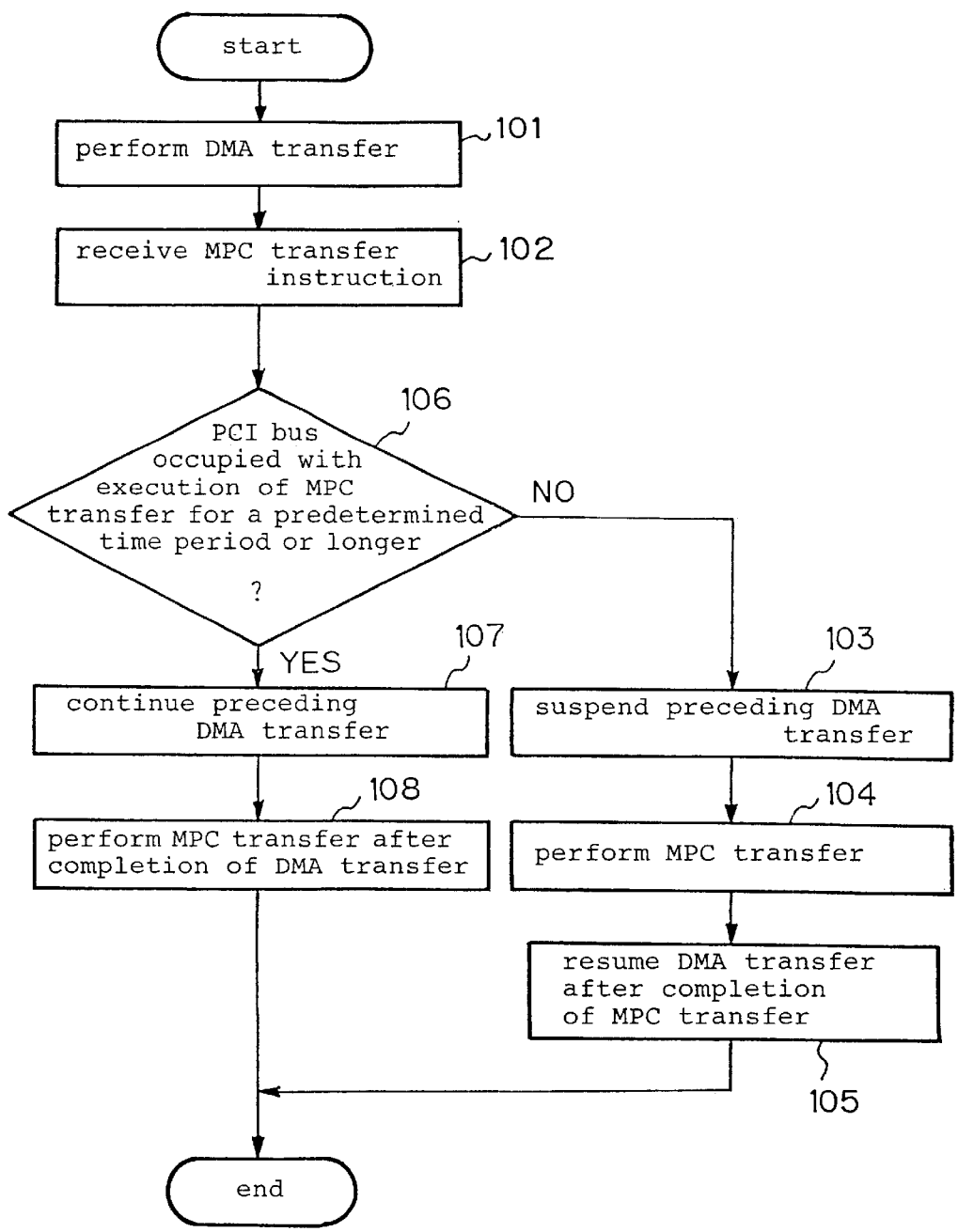
FIG. 6 is a flow chart illustrating operation of the data transfer control apparatus in FIG. 5.

Next, operation will be described with reference to a flow chart in FIG. 6 in a case where a request for MPC transfer is issued from MPC 2 while DMA transfer is being performed in the data transfer control apparatus of the embodiment.

First, DMA transfer is performed at step 101. Bridge circuit 7 receives an MPC transfer instruction from MPC 2 before the completion of the DMA transfer at step 102. At step 106, PCI monitoring unit 8 measures a time period over which PCI bus 7 is to be occupied with execution of MPC transfer to make a check to determine whether the measured time period is equal to or greater than a predetermined time period.

If it is determined that PCI bus 6 is not to be occupied with execution of MPC transfer for the predetermined time period or longer at step 106, then the preceding DMA transfer is suspended at step 103. MPC transfer is performed at step 104, and the DMA transfer is resumed after the completion of the MPC transfer at step 105.

If it is determined that PCI bus 6 is to be occupied with execution of MPC transfer for the predetermined time period or longer at step 106, then the preceding DMA transfer is not suspended but continues at step 107. At step 108, MPC transfer is performed after the completion of the DMA transfer.

The data transfer control apparatus of the embodiment is designed to perform MPC transfer after the completion of DMA transfer without suspending DMA transfer when it is determined that PCI bus 6 is to be occupied with MPC transfer for the predetermined time period or longer. Consequently, DMA transfer is not suspended by MPC transfer for a long time to prevent a data transfer rate to be lowered, thereby improving throughput of data transfer.

In the embodiment, MPC transfer with a duration shorter than the predetermined time period is not performed but is made to wait while DMA transfer is being performed. However, with generally a little possibility of DMA transfer requiring a long time, there is little likelihood that an execution instruction for MPC transfer should be on standby for a long time due to the execution of DMA transfer. For this reason, such control as in the embodiment hardly generates a detrimental effect.

Although the present embodiment has been described in conjunction with a case where an execution instruction for MPC transfer is made during DMA transfer, the present invention is not limited to such a case; control may be performed such that when DMA transfer conflicts with MPC transfer, either of the data transfer with a shorter processing time is performed with a higher priority.

Additionally, it is possible that when an execution instruction for DMA transfer is issued during execution of MPC transfer requiring a long time, the DMA transfer is performed with a higher priority if the DMA transfer requires a time period shorter than a predetermined time period.

Although the embodiment has been described in conjunction with a case where a PCI bus is used as an interface for data transfer to and from an MPC for performing data control, data processing or the like, the present invention is not limited thereto; the present invention is also applicable to another apparatus which has another interface as an interface for data transfer to and from an MPC and which suspends DMA transfer to perform MPC transfer when an MPC transfer instruction is issued during the DMA transfer.

While a preferred embodiment of the present invention has been described using specific terms, such description is for illustrative purposes only, and it is to be understood that changes and variations may be made without departing from the spirit or scope of the following claims.

What is claimed is:

1. A method of controlling data transfer between external peripheral devices connected to a microprocessor through a data bus, said method comprising the steps of:

monitoring a data transfer instruction on said data bus;

when an execution instruction for MPC transfer is issued, measuring a time period over which said data bus is to be occupied with said MPC transfer, said MPC transfer being data transfer in accordance with directions from said microprocessor;

when said data bus is to be occupied with said MPC transfer for a predetermined length of time or longer, performing said MPC transfer instruction after the completion of DMA transfer without suspending said DMA transfer, said DMA transfer being data transfer between said external peripheral devices; and when said data bus is to be occupied with said MPC transfer for less than said predetermined length of time, suspending said DMA transfer, performing said MPC transfer, and resuming said DMA transfer after completion of said MPC transfer.

2. The data transfer control method according to claim 1, wherein said data bus is a PCI bus.

3. A data transfer control apparatus comprising:

an MPC for effecting data control and data processing in accordance with directions from a microprocessor;

a SCSI protocol controller connected to a data bus, for effecting a control of a SCSI device;

an external SCSI peripheral device connected to said data bus; and a bridge circuit for effecting a connection between said MPC and said data bus and including monitoring means for monitoring a data transfer instruction on said data bus;

said bridge circuit further adapted to measure a time period over which said data bus is to be occupied with MPC transfer when an execution instruction for MPC transfer is issued, said MPC transfer being data transfer in accordance with directions from said MPC;

wherein, when said data bus is to be occupied with said MPC transfer for a predetermined length of time or longer, said bridge circuit performs the execution instruction for said MPC transfer after the completion of DMA transfer without suspending said DMA transfer, said DMA transfer being data transfer between said SCSI protocol controller and said external peripheral device; and wherein, when said data bus is to be occupied with said MPC transfer for less than said predetermined length of time, said bridge circuit suspends said DMA transfer, performs said MPC transfer, and resumes said DMA transfer after completion of said MPC.

4. The data transfer control apparatus according to claim 3, wherein said data bus is a PCI bus.

* * * * *